UNITED STATES PATENT OFFICE.

CHARLES SHIPP, OF BARNSBURY, LONDON, ENGLAND, ASSIGNOR TO BENJAMIN FRANKLIN NICHOLS, OF LONDON, ENGLAND.

COVERING FOR DRAWING-ROLLS.

No. 797,923.    Specification of Letters Patent.    Patented Aug. 22, 1905.

Application filed September 16, 1904. Serial No. 224,755.

*To all whom it may concern:*

Be it known that I, CHARLES SHIPP, a subject of the King of England, residing at Barnsbury, London, England, have invented certain new and useful Improvements in or Relating to Coverings for Drawing-Rolls for Fibrous Materials, of which the following is a specification.

The present invention relates to improvements in the coverings of drawing-rolls for elongating, evening, and reducing slivers of fibrous material preparatory to spinning or twisting the same into yarns or threads, the object being to provide a roller which can be easily constructed with a cushion-surface which will not be sticky or uneven or wear unequally.

In my previous patent, No. 761,854, dated June 7, 1904, I have described a roll-cover consisting of a wear-resisting cushion composition upon a textile backing, the chief constituent of the composition being Chinese wood-oil. According to the present invention it is found that a composition of the required qualities can be produced at considerably less expense than hitherto by replacing the Chinese wood-oil by a mixture of Chinese wood-oil and linseed-oil. In the composition the following ingredients may, for example, be employed: boiled Chinese wood-oil, twenty parts; boiled and oxidized linseed-oil, sixty-five parts; kauri gum, fifteen parts. The substances are mixed together in a heated condition. If desired, twelve parts of resin may be added. This mixture is termed a "cement." Thereafter eighty parts of finely-ground pulverized cork are mixed with one hundred parts of the cement and, if desired, with a small percentage of vegetable black. The whole is then rolled through heated rollers onto a backing of cloth of any desired quality and thickness, which is inextensible in comparison with the composition. The thickness of the composition may, for example, be one-thirty-second of an inch.

The ingredients used in the composition and their proportions may be varied without departing from this invention.

It is found that by the use of a mixture of Chinese wood-oil with linseed-oil in combination with cork and kauri gum the layer of composition adheres with great tenacity to the backing and is not peeled off nor permanently marked by the fluted under rolls in conjunction with which the drawing-rolls are used.

The covering is cut into pieces of exactly the size required to surround the metal rollers, and in order to harden the composition it is dried at a high temperature either before or after application to the roller.

What I claim as my invention, and desire to secure by Letters Patent, is—

1. A composition of matter for use in covering drawing-rolls which consists of boiled and oxidized linseed-oil and boiled Chinese wood-oil heated with kauri gum and ground up with cork.

2. A composition of matter for use in covering drawing-rolls which consists of boiled and oxidized linseed-oil and boiled Chinese wood-oil heated with kauri gum, ground up with cork and rolled onto a backing of cloth.

3. A composition of matter for use in covering drawing-rolls which consists of boiled and oxidized linseed-oil and boiled Chinese wood-oil heated with kauri gum and resin, ground up with cork and rolled onto a backing of cloth.

In testimony whereof I have signed my name to this specification in the presence of two subscribing witnesses.

CHARLES SHIPP.

Witnesses:
 WILLIAM H. BALLANTYNE,
 HARRY B. BRIDGES.